United States Patent
Hubbel

[15] 3,639,721
[45] Feb. 1, 1972

[54] METHOD OF INSTALLING BRAZING RINGS

[72] Inventor: Edward F. Hubbel, Howell, Mich.
[73] Assignee: Aeroquip Corporation, Jackson, Mich.
[22] Filed: Nov. 13, 1970
[21] Appl. No.: 89,382

[52] U.S. Cl............................................219/91, 219/85
[51] Int. Cl.....................................................B23k 11/10
[58] Field of Search................219/91, 94, 105, 85, 118, 137, 219/95

[56] References Cited

UNITED STATES PATENTS 3,419,953  1/1969  Deimen.............................219/85 X
1,310,419  7/1919  Kicklighter.........................219/94 X Primary Examiner—J. V. Truhe
Assistant Examiner—J. G. Smith
Attorney—Jerry K. Harness

[57] ABSTRACT

A method of installing segmented brazing rings in the recessed beads of pipe fittings. The fitting is cleaned to eliminate surface contamination, a preformed brazing ring segment is inserted in the bead, and the segment is spotwelded in position using a capacitor discharge impulse welder. The remaining brazing ring segments are then similarly spotwelded in position.

1 Claims, 3 Drawing Figures

PATENTED FEB 1 1972 3,639,721

INVENTOR.
Edward F. Hubbel
BY Jerry K. Harness
his attorney

METHOD OF INSTALLING BRAZING RINGS

BACKGROUND OF THE INVENTION

1. Field of the Invention

The invention relates to brazed fittings, and particularly to fittings of the type in which recessed beads are provided for the reception of rings of brazing material. When the brazing rings are made from brazing alloy wires of gold or silver, which are normally ductile in nature, the assembly process is to form a split ring of the brazing material, compress the ring, insert it in the fitting, and push the ring into the fitting until it snaps into the bead.

Certain types of fittings however, such as titanium spacecraft fittings, require brazing alloys that are inherently brittle in nature and cannot be collapsed to a diameter small enough to use in the above manner. The method of assembly then requires that the ring be made up of several segments and installed into the cleaned fitting.

2. Description of the Prior Art

The normal method employed to install the preformed segmented brazing rings into the fitting was to clean the fitting, place a small quantity of liquid acrylic adhesive in the bead, insert the preformed alloy ring segments, let the adhesive dry, and package. This process was slow and tedious. The acrylic adhesive added to the contamination level of the argon shielding gas during the brazing cycle, and periodically was the cause of low-quality joints due to porosity created by the burning of the adhesive. The process also made it necessary to maintain a "clean room" environment during assembly and was not conducive to increased production or quality.

BRIEF SUMMARY OF THE INVENTION

According to the invention, the segmented brazing ring is mounted in position by spotwelding, using a capacitor-type discharge impulse spot welder. This type of welder has moderate voltage and current, with good current control. In carrying out the invention, the fitting is cleaned to eliminate surface contamination, a preformed brazing ring segment is inserted in the fitting bead, and is spotwelded into position. The remaining segments may then be successively mounted in a similar manner.

This method eliminates the disadvantages of the previously described process and is rapid, simple and reliable. No special operator skill is required and production jigging is simple and inexpensive. The equipment required to produce the desired spot weld requires a very small investment and there are no metallurgical abnormalities to the fitting or brazing alloy preform. The parts are readily cleaned after the rings are spotwelded in place. The process does not produce any fumes or particulate contamination during assembly or during the brazing cycle, nor does it require an inert atmosphere or "clean room" conditions.

DESCRIPTION OF THE PREFERRED EMBODIMENT

Figure 1:
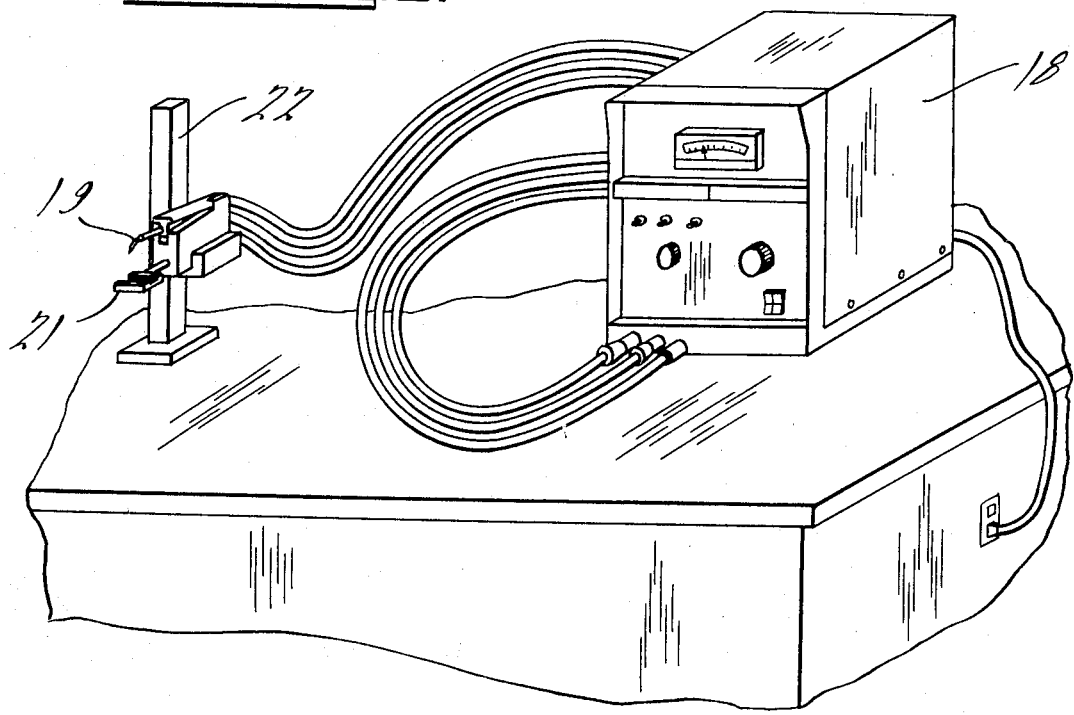
FIG. 1 is a perspective view showing a setup for spot welding the preformed brazing ring segments.
Figure 2:
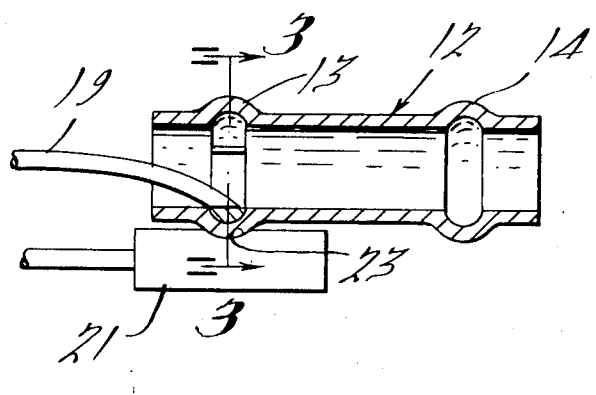
FIG. 2 is a partially schematic cross-sectional view in elevation showing a typical fitting with the segments in position and with one segment being spotwelded.
Figure 3:
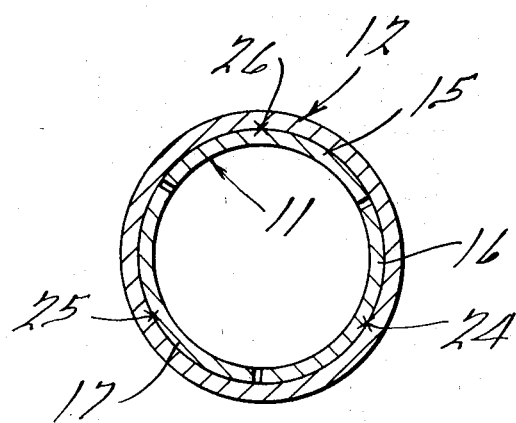
FIG. 3 is a cross-sectional view taken along the line 3—3 of FIG. 2 and showing the location of the brazing ring segments.

The process is intended to mount a brazing ring generally indicated at 11 in a fitting generally indicated at 12, such as a titanium spacecraft fitting. The fitting is of tubular shape for receiving the pipe ends, and is provided with one or more recessed beads 13 and 14. Although a union is shown in the drawing, the method is equally applicable to other fittings such as T's, elbows or crosses.

Brazing ring 11 may be of a brittle material such as a titanium-zirconium-beryllium alloy used with titanium fittings. Normally at least three segments 15, 16 and 17 will comprise the brazing ring so that it may be inserted in bead 13 and 14 without the necessity of deforming or collapsing the ring.

According to the novel method, the fitting is first cleaned to eliminate any surface contamination. A preformed brazing ring segment 15, 16 or 17 is then inserted in the bead and is spotwelded in position. The spot-welding portion of the method involves the use of a capacitor discharge impulse spot welder 18. This welder is connected to electrodes 19 and 21 which engage the segment and fitting respectively. If the electrodes are mounted on a stand 22 as shown in FIG. 1, electrode 21 will support fitting 12 and have a recess 23 for the reception of the bead. Electrode 19 will be in the form of a probe which will enter the adjacent end of the fitting and engage the brazing ring segment. The fitting will be rotated after each segment is spot welded until the entire segmented brazing ring is in position. The result will be brazing rings that are spotwelded at 24, 25 and 26 respectively to the inside of the bead.

The strength of the impulse used to spotweld each segment is dependent upon the size of the fitting, and preferably is between 50 and 170 watt-seconds. For example, a typical size 6 fitting (for ⅜-inch tube) might use a 50-watt-second impulse whereas a size 16 fitting (for 1-inch tube) might use a 170-watt-second impulse.

It has been found that this process produces uniformly high quality brazed fittings with the advantages described above.

What is claimed is:

1. In a method for installing a segmented brazing ring in a tubular fitting having a bead recessed outwardly, the steps of cleaning the fitting to eliminate surface contamination, inserting a first arcuate segment of the brazing ring into the fitting bead, spotwelding said segment in position by using a welding device having one electrode engaging the outside of the bead adjacent said first segment and another electrode extending into the fitting and engaging the inside of the segment, rotating the fitting, and repeating the steps of inserting a brazing ring segment and spotwelding the segment in position until the proper amount of brazing ring segments are secured in position.

* * * * *